United States Patent [19]
Furlong et al.

[11] Patent Number: 5,358,760
[45] Date of Patent: Oct. 25, 1994

[54] PROCESS FOR PRODUCING SOLID BRICKS FROM FLY ASH, BOTTOM ASH, LIME, GYPSUM, AND CALCIUM CARBONATE

[75] Inventors: Tresea Furlong; John Hearne, both of Nacogdoches, Tex.

[73] Assignee: Earl Richhart, Nacogdoches, Tex.

[21] Appl. No.: 76,998

[22] Filed: Jun. 14, 1993

[51] Int. Cl.$^5$ .................. B32B 1/06; B32B 13/00; B32B 13/12
[52] U.S. Cl. ...................... 428/70; 428/76; 428/2; 428/903.3; 588/257
[58] Field of Search ................ 428/2, 903.3, 76, 70; 588/256, 257

*Primary Examiner*—Alexander S. Thomas
*Attorney, Agent, or Firm*—Pravel, Hewitt, Kimball & Krieger

[57] ABSTRACT

A method of using waste materials produced by coal combustion to produce useful products. In one embodiment the invention provides solid bricks produced by compressing together fly ash, bottom ash, gypsum, calcium carbonate, and lime. These bricks have sufficient structural strength for use in building and construction. In another embodiment, waste materials are encapsulated in a mixture of fly ash, bottom ash, gypsum, lime, and calcium carbonate and compressed into bricks that may be disposed of in an environmentally acceptable manner. Further, the compressed bricks containing waste material may be coated with an impermeable membrane of a synthetic polymeric material. Further, the invention provides a mobile, trailer-mounted apparatus for compressing the mixtures into bricks.

4 Claims, 2 Drawing Sheets

PROCESS FOR PRODUCING SOLID BRICKS FROM FLY ASH, BOTTOM ASH, LIME, GYPSUM, AND CALCIUM CARBONATE

BACKGROUND OF THE INVENTION

1. Field of the Invention

This invention relates to the use of waste materials produced by coal-fired equipment to produce useful products. Specifically, the invention provides solid bricks produced by a process utilizing fly ash, bottom ash, and other components. Further, the solid bricks may be used to encapsulate waste materials and, if necessary, may be coated with an impermeable synthetic polymer film.

2. Description of the Related Art

There are currently a large number of coal-fired power plants operating in the United States. At normal levels of production, these power plants annually produce millions of tons of fly ash and bottom ash, the residual waste product produced by burning coal. Because these waste products contain heavy metal elements and potentially harmful chemical elements, they pose a disposal problem and also require fairly expensive material handling procedures and equipment.

The disposal expenses and problems posed by both fly ash and bottom ash are further compounded by the ever decreasing availability of landfills for disposal of these waste materials. Further, this method of disposal also presents problems because of the solubilization of contaminants and heavy metals in these ashes that can leach from the waste and contaminate underground aquifers, which are frequently a source of water supply for municipalities and farms.

At the same time, the growth of the oil and chemical industry has lead to a tremendous increase in the production of waste byproducts from oil refining and chemical processes. These waste byproducts must be disposed of in an environmentally responsible manner. Typically, these wastes are disposed of in hazardous waste landfills, at great expense. The wastes, if liquid, are typically placed in drums which are then placed in the storage site. This method of disposal is contentious because it is asserted that these drums cannot provide permanent containment of the waste but will deteriorate over a period of time so that leakages will inevitably result. These leakages of hazardous material could then seep into the soil ultimately reaching and contaminating underground aquifers that are a source of potable water.

Concurrently, there is also a need in the United States for inexpensive housing. This need has arisen due to the gradual but inexorable growth in population and the increasing cost of land in and around the major cities of the United States. This problem is clearly in a technology sense unrelated to the problems posed by wastes generated from coal-fired power plants and the wastes generated from oil and chemical industrial processes. However, it would be desirable to find a solution that encompasses all of these problem areas.

SUMMARY OF THE INVENTION

The invention provides a solution to the disposal problem posed by the production of millions of tons of fly ash and bottom ash by coal-fired power plants. Further, the invention provides a solution to the long-term safe storage and disposal of oil and chemical process industry wastes. Finally, the invention also provides a solution to the problem of providing relatively inexpensive construction material for housing and other purposes.

The invention provides solid bricks produced by the invention process of compressing a mixture of fly ash, bottom ash, lime, gypsum, and calcium carbonate, in specified quantities. These solid bricks have a relatively low porosity, high compressive strength, and low thermal conductivity so that they are suitable for use in constructing homes. Further, due to the relatively high strength of the material, better than that of concrete, the material can be used for structural supports and other applications, such as road building, as a substitute for concrete or other materials.

The invention provides solid bricks produced by an invention process that compresses fly ash, bottom ash, lime, gypsum, and calcium carbonate, together with a waste product, such as an oil or chemical industrial waste or a municipal waste. The waste is encapsulated within the solid brick and will not leach from the relatively impermeable bricks. Although, depending upon the nature of the waste, these bricks sometimes may be readily disposed of in a waste disposal site, in other instances it may be preferable to coat the solid bricks with an impermeable, adherent film of a stable synthetic polymeric material, preferably polyurethane elastomer or an epoxy.

The invention process includes several steps, including a step of compressing a mixture of fly ash, bottom ash, lime, gypsum, and calcium carbonate under pressures ranging from 1,500 to 2,350 psi, to produce a solid brick. Further, for the waste disposal embodiment, the process requires that the waste be added to the fly ash, bottom ash, lime, gypsum, and calcium carbonate mixture before compression. Depending upon the type of waste being encapsulated, compression pressure may range from about 500 psi to about 7,000 psi. After compression, the bricks are allowed to cure at ambient temperatures, preferably above 32° F., for about 25-30 days to develop strength. Curing conditions are similar to those for Portland cement.

Furthermore, the invention also includes mobile apparatus that can be driven to an existing coal-fired plant for ease of access to fly ash and bottom ash to practice the invention process. This mobility allows significant savings in terms of avoided handling and transportation of mass quantities of fly ash and bottom ash to a central site for processing.

The invention provides a unique and useful process for disposal of significant quantities of waste and for relieving pressure on scarce landfill resources while also providing a relatively inexpensive material suitable for use in many construction applications, including housing. Further, the invention saves significant amounts of energy in providing a mobile apparatus that can travel to coal-fired power plants for carrying out the invention process, thereby avoiding the expense and energy needed to transport large quantities of fly ash and bottom ash.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
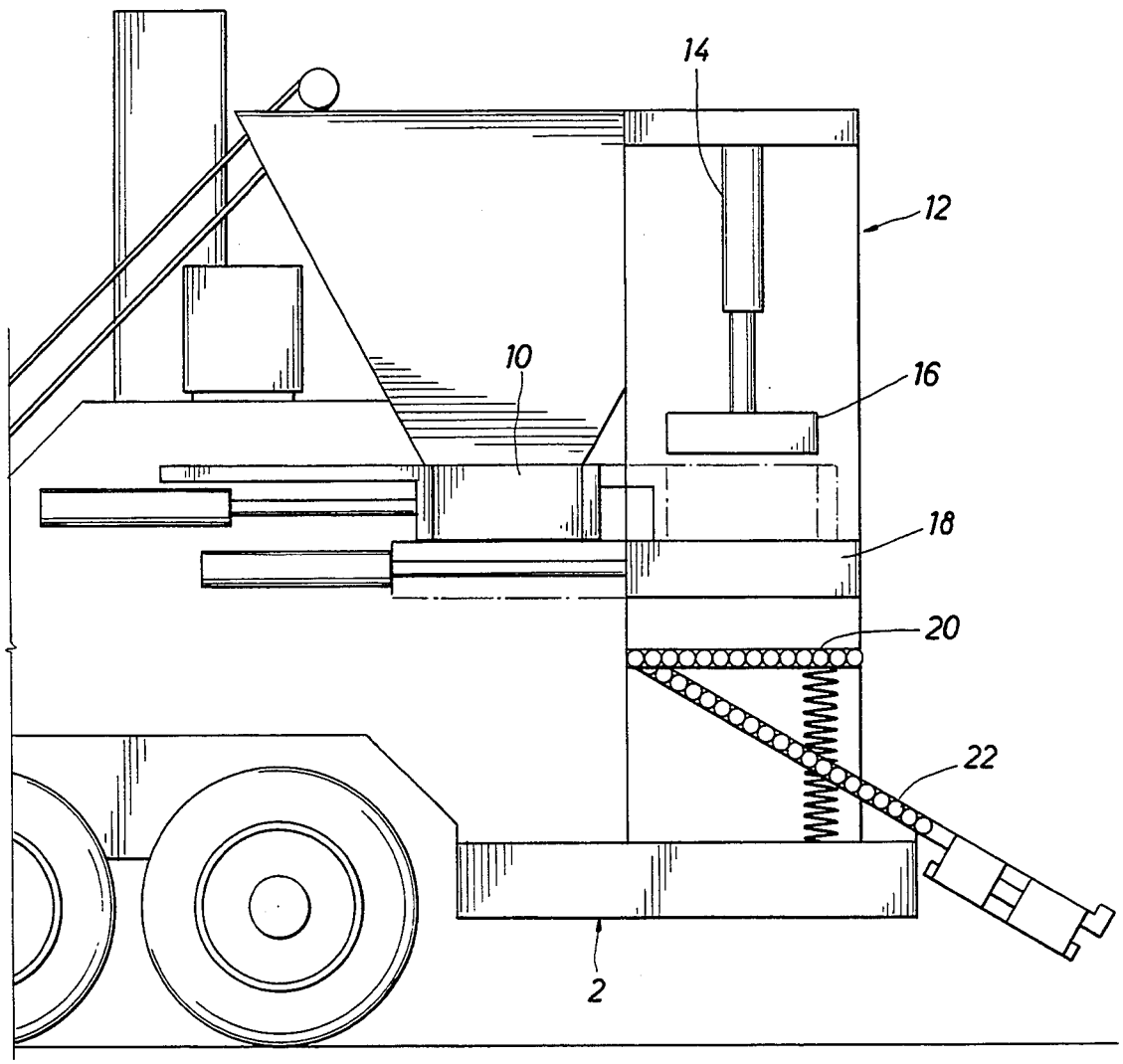
FIG. 1 is a schematic side view of a portion of the mobile apparatus of the invention.

As indicated above, the invention utilizes fly ash and bottom ash, both waste products of coal combustion in, for instance, coal-fired power plants, as components of a compressed solid brick. Fly ash, as defined in ANSI/ASTM C618-77 4.2, is a "finely divided residue that results from the combustion of powdered coal." This ash will usually pass 70% of its volume through a 200 mesh sieve. The ash is typically collected in power plants, by mechanical means or electrostatic precipitators, from the combustion gas effluent stream. The type of fly ash produced depends upon the type of coal or lignite being burned. Thus, class C fly ash results from the combustion of lignite or subituminous coal, while class F results from the combustion of anthracite or bituminous coal. Class C fly ash contains a higher lime content, exceeding 10%. Thus, class C fly ash has greater pozzolanic properties. The calcium content of fly ash is readily determined by conventional means, as outlined by ASTM test C 114 "Chemical Analysis of Hydraulic Cement."

Bottom ash is also produced by the burning of powdered coal, but is obtained in cinder form. This waste usually falls through a grate in the bottom of the steam boiler and is removed with water to settling ponds for subsequent rehandling and disposal. The sizes of bottom ash particles vary greatly, some fines passing through a 100 or 200 mesh sieve. These fines usually make up about 20% of the bottom ash, and are not desirable if the bottom ash must be used as an aggregate component. However, while not desirable as an aggregate component, the fines may serve as a filler or a means to prevent interstices in the final formation of the block and to homogenize or buffer the interaction of the materials being compressed. Larger bottom ash particles are not readily separable when wet, and must be dry screened.

In one embodiment, the invention provides solid bricks that are useful as a construction material. These bricks are produced by compressing under pressures ranging from about 1,500 psi to about 2,350 psi, preferably from about 1,750 psi to about 2,150 psi, and most preferably from about 1,950 psi to about 2,150 psi, a mixture of fly ash, bottom ash, lime, gypsum, and calcium carbonate. Preferably, the mixture is made up of from about 40 to about 45 wt. % fly ash, from about 40 to about 45 wt. % bottom ash, from about 5 to about 10 wt. % lime, from about 2.5 to about 5 wt. % gypsum, and from about 2.5 to about 5 wt. % calcium carbonate. More preferably, the mixture is made up of from about 37 to about 40 wt. % fly ash, from about 37 to about 40 wt. % bottom ash, from about 7 to about 10 wt. % lime, from about 2.5 to about 4 wt. % gypsum, and from about 2.5 to about 4 wt. % calcium carbonate. The resultant bricks cure over a period of time to high compression strength. As used in this specification, the term "high compression strength" means a strength of over about 1250 psi after a 15 day cure or a strength of over about 1750 psi after a 28 day cure. In general, the building blocks produced have thermal conductivities and porosities similar to that of adobe bricks. Consequently, they are energy efficient building materials.

In one of the embodiments of the invention, the solid bricks are used to encapsulate a waste material. These waste materials could constitute virtually any kind of liquid or solid material whether or not classified as a "hazardous waste" by the United States Environmental Protection Agency (EPA). This mixture is then compressed under pressures ranging from about 500 psi to about 7,000 psi, depending upon the water content of the hazardous waste material, and allowed to cure under ambient conditions to hardness.

When the waste is an oily sludge, the waste is mixed with from about 25 to about 40 wt. % fly ash; from about 25 to about 40 wt. % bottom ash; from about 10 to about 15 wt. % lime, from about 2 to about 3 wt. % gypsum; and from about 2 to about 3 wt. % calcium carbonate. More preferably, the mixture includes about 33 wt. % oily sludge; about 25 wt. % fly ash; about 25 wt. % bottom ash; about 10 wt. % lime; about 3 wt. % gypsum; and about 3 wt. % calcium carbonate. These mixtures are preferably compressed under pressures exceeding 2,150 psi, but less than 2,250 psi, and are allowed to cure at ambient temperatures for a time sufficient to harden the mixture and encapsulate the waste in the compressed block.

When the waste is a spent acid such as spent sulfuric acid produced by a galvanizing plant, then about 15 to about 25 wt. % of the waste is added to a mixture comprising from about 33 to about 40 wt. % fly ash; from about 33 to about 40 wt. % bottom ash; from about 7 to about 8 wt. % lime; about 1 wt. % calcium carbonate; and about 1 wt. % gypsum. More preferably, the mixture comprises about 25 wt. % of the acid waste; about 33 wt. % fly ash; about 33 wt. % bottom ash; about 7 wt. % lime; about 1 wt. % calcium carbonate; and about 1 wt. % gypsum. These mixtures are then compressed into blocks under pressures from about 1,850 psi to about 1,950 psi.

When the waste is an incinerator combustion product such as municipal incinerator ash produced when hazardous wastes are combusted, then about 33 to about 75 wt. % of the ash is combined with from about 10 to about 20 wt. % fly ash; about 10 to about 20 wt. % bottom ash; about 2 to about 5 wt. % lime; about 1 to about 2 wt. % gypsum; about 1 to about 2 wt. % calcium carbonate. More preferably, about 75 wt. % incinerator ash is combined with about 10 wt. % fly ash, about 10 wt. % bottom ash, about 1 wt. % lime, about 1 wt. % gypsum, about 1 wt. % calcium carbonate. These mixtures may be formed into blocks by compression under from about 1,950 to about 2,050 psi.

When the waste is a municipal waste water treatment sludge containing heavy metals, then about 15 to about 21 wt. % of the waste is combined with about 30 to about 35 wt. % fly ash; about 30 to about 35 wt. % bottom ash; about 5 to about 10 wt. % lime; about 1 to about 2.5 wt. % gypsum; and about 1 to about 2.5 wt. % calcium carbonate. More preferably, about 20 wt. % of the waste is mixed with about 33 wt. % fly ash, about 33 wt. % bottom ash, about 10 wt. % lime, about 2 wt. % calcium carbonate, and about 2 wt. % gypsum. The mixtures are compressed into blocks at pressures of preferably from about 6,750 to about 6,950 psi.

Likewise, other wastes may be mixed with fly ash, bottom ash, lime, gypsum, and calcium carbonate to produce mixtures that may be compressed into blocks. These wastes include toxic chemicals such as polychlorinated biphenyls (PCBs), dioxin, spent acid, and the like, as well as chemical and oil refinery process wastes. These waste-containing blocks are then allowed to cure, even at ambient temperatures, for a time sufficient for the blocks to harden and encapsulate the waste. The hardened blocks may then be disposed of in an environmentally acceptable manner.

Figure 2:
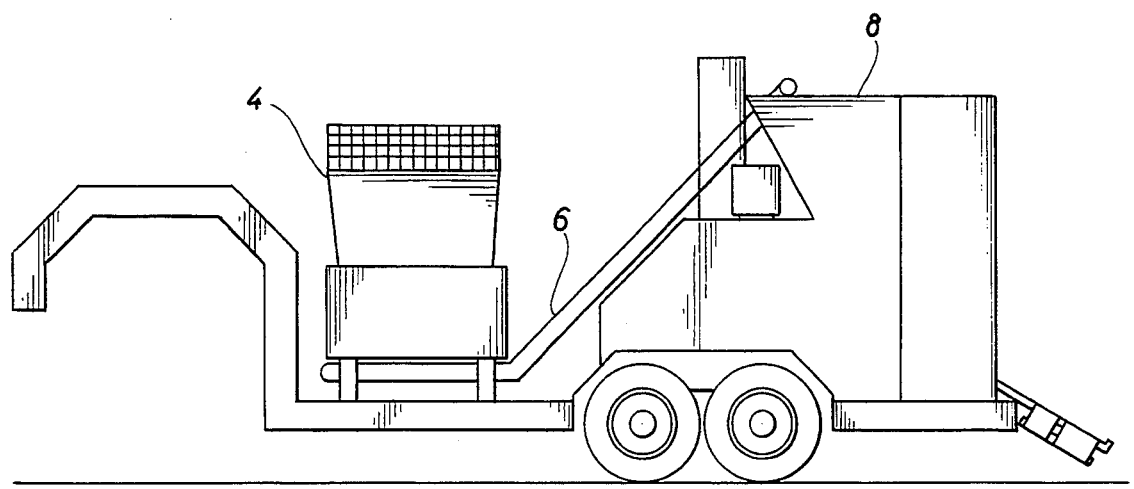
FIG. 2 is a schematic side view of the invention mobile apparatus.

Turning now to the drawings, FIG. 1 shows a schematic side view of some of the needed equipment for carrying out the invention process, mounted on a trailer. FIG. 2 shows additional equipment, including a mixer unit. Referring to these two figures, all equipment is mounted on a mobile trailer that can be transported to the fly ash/bottom ash dump-site. Fly ash, bottom ash, lime, gypsum, and calcium carbonate are fed to mixer units 4 mounted atop the trailer 2. After mixing, the mixture is discharged onto a conveyor means 6 and transported to a feed supply means such as a hopper 8. Moveable molds 10 are located beneath the hopper to receive mixture. These molds 10 are moveable from a position under the hopper, a feed receiving position, to a feed compression position (shown in dashed lines in FIG. 1). Once filled, the molds 10 are moved into the mixture compressing position within the compression means, typically a hydraulic press 12 having compression members 14 equipped with press plates 16 sized to cooperate with the open upper surface of the molds 10. Pressure is then applied by press 12 to press plate 16 thereby compressing mixture in mold 10. Once the mixture in mold 10 has been compressed for a sufficient amount of time for its volume to stabilize and to produce a solid brick, the pressure on press plate 16 is reduced and the press table 18 beneath the mold 10 is withdrawn from its extended position (shown in FIG. 1 in solid lines) to its retracted position (shown in FIG. 1 in dashed lines) and the press plate 16 is used to expel the solid brick through the mold onto a means for conveying the brick from the press, in this instance, a spring-loaded receiving table 20. From this table, the brick advances onto a hinged conveyor belt system 22 for removal.

Figure 3:
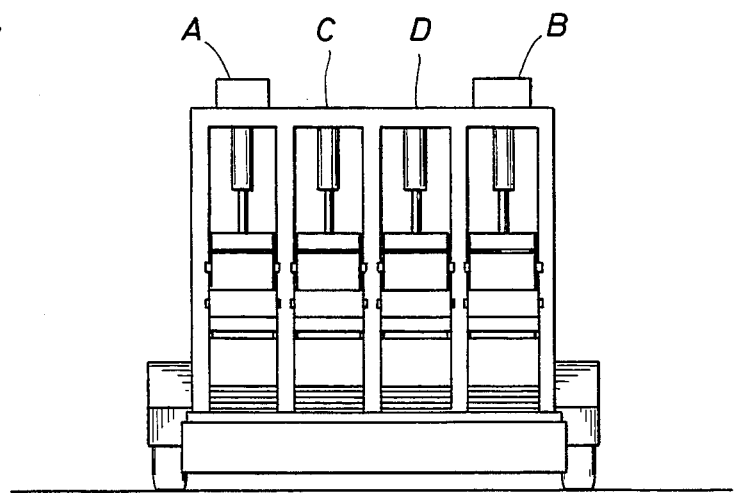
FIG. 3 is an end view of an embodiment of the compression presses of the invention apparatus.

While the above explanation, for simplicity, deals with the use of a single mold, it is clear that multiple molds can be utilized to speed up the brick making process. For instance, FIG. 3 shows an end view indicating four molds. While FIG. 3 only shows four molds, a person of ordinary skill in the art would readily appreciate how to extend the number of molds, as needed, to further increase the production rate from the apparatus.

In order to facilitate the use of the invention apparatus, the apparatus may be controlled by a suitable computer program in a computer unit that controls the sequence of operations and compressing pressures. Thus, the computer could control the relative proportions of components fed to mixer unit 4, the rate of feed to hopper 8, and the opening and closing of shutters in the base of hopper 8 to coordinate with the positions of the molds beneath the shutters, e.g., shutter open when mold beneath hopper, shutter closed when mold moved to compression position. Further, the computer may control the pressure applied when the mold is beneath the pressure plate 16 and the duration for which such pressure is applied. Further, the computer could control the retraction of press table 18 and the slackening off of pressure applied by pressure foot 16 while expelling solid brick from the mold onto the receiving table 20. Likewise, the computer can be used to control the speed of the conveyor system for removing the produced bricks.

The following examples are illustrative of the invention and do not in any way limit the scope of the invention as disclosed above and claimed here below.

EXAMPLE 1

Nine mixtures were prepared and compressed under pressure into blocks. The compressive strength of the blocks was then measured.

1. A mixture containing 15 wt. % spent sulfuric acid, 38 wt. % fly ash, 38 wt. % bottom ash, 7 wt. % lime, 1 wt. % calcium carbonate, and 1 wt. % gypsum was prepared. This was poured into a mold and subjected to compressive force of 2150 psi to form a block. The block was then cured for 28 days and then subject to compression testing. The results are shown in Table 1.
2. Mixtures containing 50% fly ash and 50% bottom ash were prepared, compressed under 2150 psi, cured for 28 days then tested for compression strength. The results of 5 prepared blocks are shown in Table 1.
3. A mixture containing 15 wt. % ferrous sulfates obtained from a flue of a galvanizing acid bath was mixed with 38 wt. % fly ash, 38 wt. % bottom ash, 7 wt. % lime, 1 wt. % calcium carbonate, and 1 wt. % gypsum. This mixture was compressed in a mold under 2150 psi into blocks which were allowed to cure for 28 days. The blocks were then subjected to a compression test under conditions which allowed the pressure to be distributed evenly across the surfaces of the block. The results of this compression test are shown in Table 1.
4. A mixture containing 50% fly ash and 50% bottom ash was compressed under 2150 psi and the resultant block was allowed to cure for 28 days. This block was then heated to 2,150° F., as a heat treatment. After cooling, the block was subjected to a compression test and the results are shown in Table 1.
5. A mixture containing 60 wt. % crude oil residue from a tank was mixed with 18 wt. % fly ash, 18 wt. % bottom ash, 1 wt. % lime and 1 wt. % gypsum. This mixture was compressed under 2150 psi and the resultant block was allowed to cure for 28 days. The block was then subjected to a compression test and the results are shown in Table 1.

EXAMPLE 2

Refinery sludge was encapsulated by the invention method into a block. Refinery sludge (50 wt. %) was mixed with 20 wt. % bottom ash, 20 wt. % fly ash and 10 wt. % lime. Samples of this mixture were then compressed into blocks under 2150 psi. Four of the blocks were tested to determine the initial compressive strength. After a cure of 15 days, a further sample of 4 blocks were tested to determine compressive strength. At 28 days, a further sample of 4 blocks was tested to determine compressive strength. These strength data, summarized in Table 2, demonstrate the dramatic increase in compressive strength obtained from curing. The initial compressive strength of about 720 psi increased up to about 2000 psi after 28 days.

TABLE 1

| Sample No. | Compressive Load (psi) |
| --- | --- |
| 1 | 1,341 |
| 2 | 490 |

TABLE 1-continued

| Sample No. | Compressive Load (psi) |
|---|---|
|  | 611 |
|  | 593 |
|  | 1058 |
|  | 335 |
| 3 | 3,280 |
| 4 | 909 |
| 5 | 177 |

TABLE 2

| Compression Strength (psi) | | |
|---|---|---|
| 0 days | 15 days | 28 days |
| 715 | 1325 | 1860 |
| 720 | 1305 | 1865 |
| 745 | 1485 | 2105 |
| 730 | 1325 | 1885 |

The foregoing disclosure and description of the invention are illustrative and explanatory thereof, and various changes in the process, materials, and conditions may occur to one of ordinary skill in the art without departing from the spirit of the invention as disclosed above and claimed below.

What is claimed is:

1. A compressed block with structural strength for use in building and construction, said block comprising:
   a cured, compressed mixture of from about 40 to about 45 wt. % fly ash; from about 40 to about 45 wt. % bottom ash; from about 2.5 to about 5 wt. % gypsum; from about 2.5 to about 5 wt. % calcium carbonate; and from about 5 to about 10 wt. % lime;
   wherein said block is prepared by compressing the mixture of fly ash, bottom ash, and waste under from about 1,500 to about 2,350 psi, without the application of externally supplied heat.

2. A compressed block encapsulating waste materials for disposal in waste storage facilities, the block having outer surfaces and the block comprising:
   a cured, compressed mixture of from about 25 to 33 wt. % fly ash; from about 2.5 to about 33 wt. % bottom ash; from about 1 to about 3 wt. % gypsum; from about 5 to about 10 wt. % lime; from about 1 to about 2 wt. % calcium carbonate; and the remainder a waste material selected from the group consisting of oily sludge, incinerator combustion product waste, spent acid, and waste water treatment sludge;
   wherein said block is prepared by compressing the mixture of fly ash, bottom ash, and waste under from about 500 to about 7,000 psi, without the application of externally supplied heat.

3. The compressed block of claim 2, further comprising a coating of a synthetic polymer forming an impermeable membrane adherent to and covering the outer surfaces of the block.

4. The compressed block of claim 3, wherein the impermeable membrane is selected from the group consisting of polyurethane elastomers and epoxy resins.

* * * * *